US010071673B2

(12) United States Patent
Van Buren et al.

(10) Patent No.: US 10,071,673 B2
(45) Date of Patent: Sep. 11, 2018

(54) MODULAR LIGHT AND ACCESSORY BAR FOR VEHICLES

(71) Applicant: Omix-Ada, Inc., Suwanee, GA (US)

(72) Inventors: Christopher D. Van Buren, Charlotte, NC (US); Patrick W. Bennett, Gainesville, GA (US); Eric Russell, Stone Mountain, GA (US)

(73) Assignee: Omix-ADA, Inc., Suwanee, GA (US)

( * ) Notice: Subject to any disclaimer, the term of this patent is extended or adjusted under 35 U.S.C. 154(b) by 0 days.

(21) Appl. No.: 15/453,753

(22) Filed: Mar. 8, 2017

(65) Prior Publication Data

US 2018/0229646 A1 Aug. 16, 2018

Related U.S. Application Data

(60) Provisional application No. 62/458,280, filed on Feb. 13, 2017.

(51) Int. Cl.

| *B60Q 3/04* | (2006.01) |
| *B60Q 1/04* | (2006.01) |
| *B60Q 1/18* | (2006.01) |
| *B60Q 1/00* | (2006.01) |
| *F21V 21/005* | (2006.01) |

(Continued)

(52) U.S. Cl.
CPC ......... *B60Q 1/0483* (2013.01); *B60Q 1/0088* (2013.01); *B60Q 1/18* (2013.01); *F21V 21/005* (2013.01); *F21V 21/30* (2013.01); *F21V 23/002* (2013.01); *B60Q 2900/10* (2013.01)

(58) Field of Classification Search
CPC ...... B60Q 1/0483; B60Q 1/18; B60Q 1/0088; B60Q 2900/10; F21V 21/005; F21V 21/30; F21V 21/002
See application file for complete search history.

(56) References Cited

U.S. PATENT DOCUMENTS

| 7,303,320 B1 * | 12/2007 | Ashley ................ | B60Q 1/0483 248/121 |
| 7,950,821 B1 * | 5/2011 | Georgitsis ........... | B60Q 1/0483 362/217.12 |
| 2003/0031018 A1 | 2/2003 | Bray et al. | |

(Continued)

OTHER PUBLICATIONS

International Search Report and Written Opinion in International Application No. PCT/US2018/017891 dated Jun. 12, 2018.

*Primary Examiner* — Ali Alavi
(74) *Attorney, Agent, or Firm* — Womble Bond Dickinson (US) LLP

(57) ABSTRACT

A modular light and accessory bar for a vehicle includes a top rail having a length selected to span a width of the vehicle along the top of the windshield, a right end, and a left end. A right side pillar is configured to be attached to the top rail at the right end thereof and extend downwardly therefrom. A left side pillar is configured to be attached to the top rail at the left end thereof and extend downwardly therefrom. The top rail is formed with at least one T-slot that extends along the length of the top rail. At least one bracket is configured to support a lighting fixture or accessory and is attachable to the T-slot of the top rail at a desired location therealong. The T-slot is configured to permit the at least one bracket to be slid to a desired location along the top rail and secured at that location. The top rail may be curved forwardly relative to the vehicle.

25 Claims, 7 Drawing Sheets

(51) Int. Cl.
*F21V 21/30* (2006.01)
*F21V 23/00* (2015.01)

(56) References Cited

U.S. PATENT DOCUMENTS

| | | | |
|---|---|---|---|
| 2008/0019141 A1* | 1/2008 | Helms | B60Q 1/0483 362/544 |
| 2009/0161377 A1* | 6/2009 | Helms | B60Q 1/0483 362/493 |
| 2013/0299538 A1 | 11/2013 | Badillo | |
| 2013/0329413 A1* | 12/2013 | Cotta, Sr. | B60Q 1/0483 362/220 |
| 2015/0021937 A1* | 1/2015 | Perez | B60Q 1/0005 293/115 |
| 2015/0224914 A1* | 8/2015 | Hasbrook | B60Q 1/0088 362/523 |
| 2015/0328964 A1 | 11/2015 | Gaudet et al. | |
| 2016/0090048 A1 | 3/2016 | Crandall et al. | |
| 2016/0356443 A1* | 12/2016 | Beiwen | B60Q 1/0483 |

* cited by examiner

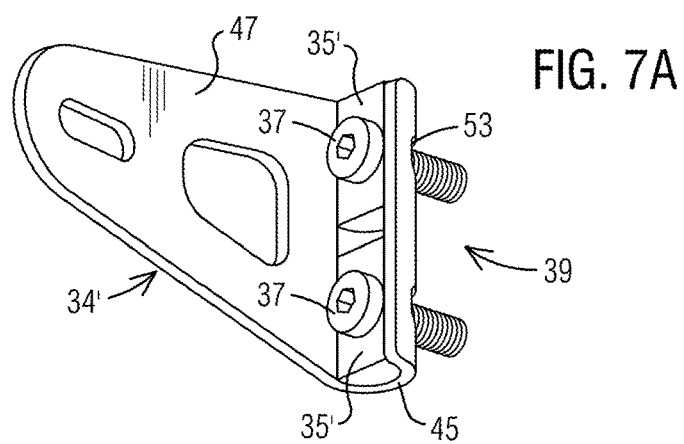
FIG. 7A
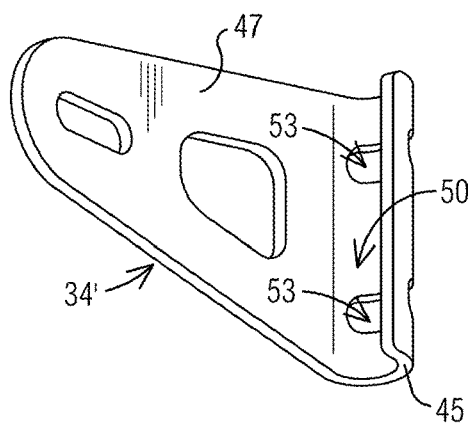
FIG. 7B
FIG. 7C
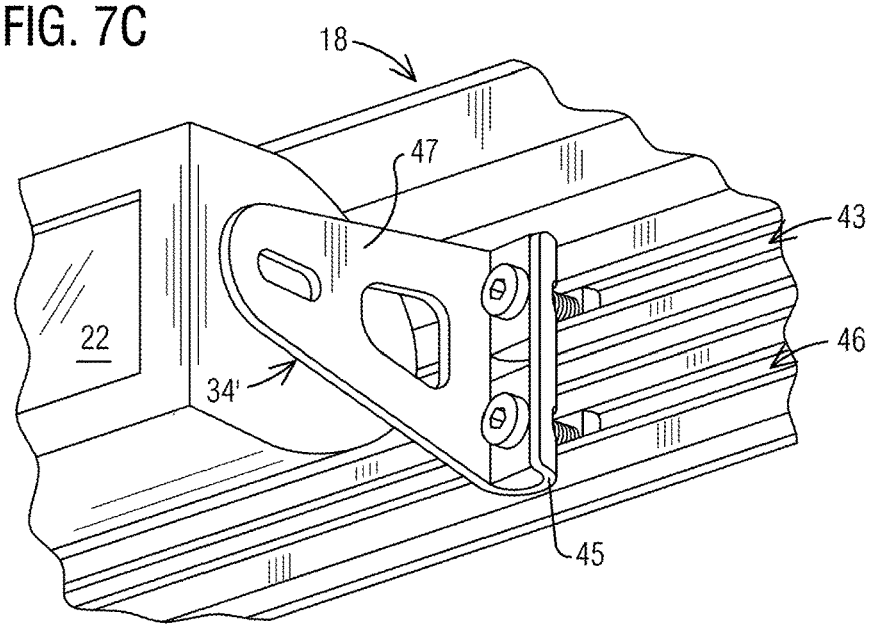

MODULAR LIGHT AND ACCESSORY BAR FOR VEHICLES

REFERENCE TO RELATED APPLICATION

Priority is hereby claimed to the filing date of U.S. provisional patent application 62/458,280 filed on Feb. 13, 2017, the contents of which are hereby incorporated by reference.

TECHNICAL FIELD

This disclosure relates generally to automotive aftermarket products and more particularly to aftermarket products and accessories for vehicles driven by their owners in rugged off-road environments, commonly known as "off-road vehicles."

BACKGROUND

Many owners and drivers of off-road vehicles such as Jeep® brand vehicles choose to enhance their stock vehicles with aftermarket accessories. Such accessories might include, for example, light guards, snorkels, winches, wheels, suspensions, special ruggedized tires, and the like. While some off-road accessories are decorative, most serve the purpose of enhancing the resiliency and survivability of the vehicle, or enhancing the experience of a driver when the vehicle is driven on very demanding and often punishing off-road terrain.

One accessory often added to an off-road vehicle is auxiliary lighting to make the path ahead more visible when off-roading after dark or in the rain and fog. Auxiliary lighting can take many forms such as, for instance, spotlights mounted on the windshield pillars, spotlights mounted on the roof of the vehicle, lights mounted on the front fender and/or its bars, spotlights mounted on a roll bar, and even lights mounted on the hood. While these solutions for providing additional light have proven useful, they nevertheless have certain problems and shortcomings inherent in their respective designs.

For example, the lights and mounting structures of prior art auxiliary lighting tend to be dedicated and permanent once mounted to the vehicle. It is difficult or impossible to exchange one type of lighting fixture for another when desired or otherwise to reconfigure the lighting configuration. Further, the positioning of individual lights is generally fixed in prior art auxiliary lighting. There is little provision in the prior art for mounting accessories other than lights such as, for instance, mirrors or sports cameras. Finally, in many prior art auxiliary lighting systems, the wiring that supplies power to lighting fixtures is visible. This is problematic and undesirable for many off-road vehicle owners who prefer a neat clean appearance.

A need exists for an auxiliary lighting system for off-road vehicles that is modular, reconfigurable as needed by adding or removing individual lighting fixtures or moving them to different locations, that is neat and clean in appearance without visible wiring, and that is adapted for the convenient mounting of accessories other than lights when desired. It is to the provision of an auxiliary lighting and accessory system for off-road vehicles that addresses these and other needs that the present invention is primarily directed.

SUMMARY

Briefly described, a modular light and accessory bar for a vehicle includes two side pillars configured to be mounted to the vehicle to the right and the left of the front windshield. The side pillars extend upwardly from the body of the vehicle to a position just above the front windshield. A horizontally oriented top rail is secured at its ends to the tops of the side pillars and extends over the top of the windshield from side to side of the vehicle. Preferably, the top rail is slightly forwardly curved. The top rail is provided with elongated T-slots that extend from end to end to accept nuts used to secure mounting brackets adjustably to the top rail. A similar T-slot extends along the side pillars also for accepting nuts used to secure mounting brackets adjustably to the side pillars. The side pillars also include an elongated wiring channel that is covered by a plastic cover. A wide array of different lighting fixtures can be mounted to the top rail and the side pillars in virtually any desired configuration. In all cases, the wiring to such lights is routed through the wiring channel of the side pillars and hidden by the plastic covers. Mounting brackets of various configurations can be mounted to the top rail and side pillars for accepting a wide range of accessories other than lights. For example, side-view mirrors or GoPro® style sports cameras can be mounted as desired for a particular off-road outing.

These and other aspects, features, and advantages of the modular light and accessory bar disclosed herein will be better appreciated upon review of the detailed description set forth below taken in conjunction with the accompanying drawing figures, which are briefly described as follows.

BRIEF DESCRIPTION OF THE DRAWINGS

FIG. 7A is a perspective view showing a pivotable mounting bracket assembly, according to one embodiment. FIG. 7B is a perspective view of a bracket of the assembly shown in FIG. 7A. FIG. 7C is a perspective, isolated view of the pivotable mounting bracket assembly of FIG. 7A supporting one end of a fixture/accessory and secured to the top rail of the light and accessory bar assembly.

DETAILED DESCRIPTION

Figure 1:
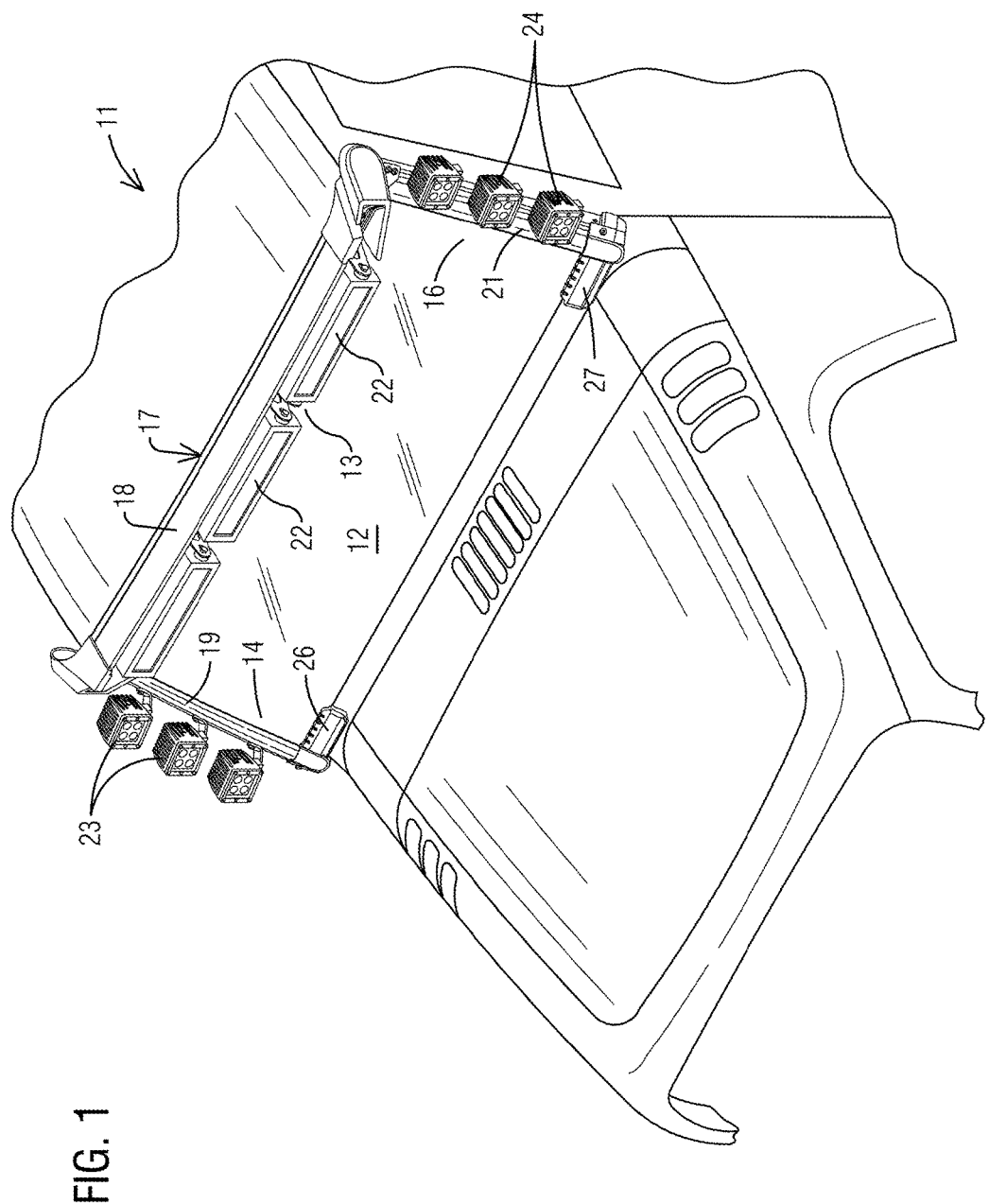
FIG. 1 is a perspective view of a modular light and accessory bar that embodies principles of the invention in one preferred embodiment, with the light and accessory bar being shown mounted to an off-road vehicle.

Reference will now be made in detail to the attached drawing figures, wherein like reference numerals refer to like parts throughout the several views. FIG. 1 depicts a vehicle 11, in this case a Jeep® brand vehicle, having a windshield 12. The windshield 12 has a top 13, a right side 14, and a left side 16. Support pillars (not visible) extend along the extreme sides of the windshield and a header (also not visible) extends along the top of the windshield. An auxiliary light and accessory bar assembly 17 is attached to the vehicle 11 and includes a top rail 18, a right side pillar 19, and a left side pillar 21. The top rail 18 extends across the vehicle at the top of the windshield and the right and left side pillars 19 and 21 extend along the support pillars of the right and left sides 14 and 16 of the windshield as shown.

A plurality of spaced lighting fixtures 22 are supported on the top rail and face forward to provide additional light ahead. Similarly, lighting fixtures 23 and 24 are attached to and spaced along the right and left side pillars and, in this figure, also face forward to provide additional light ahead. As discussed in more detail below, the lighting fixtures shown in FIG. 1 may easily be reconfigured or replaced by other and different lighting fixtures or by other accessories such as mirrors or sports cameras. In this way, the lighting and accessory bar of the present invention may be said to be "modular" in its uses.

Figure 2:
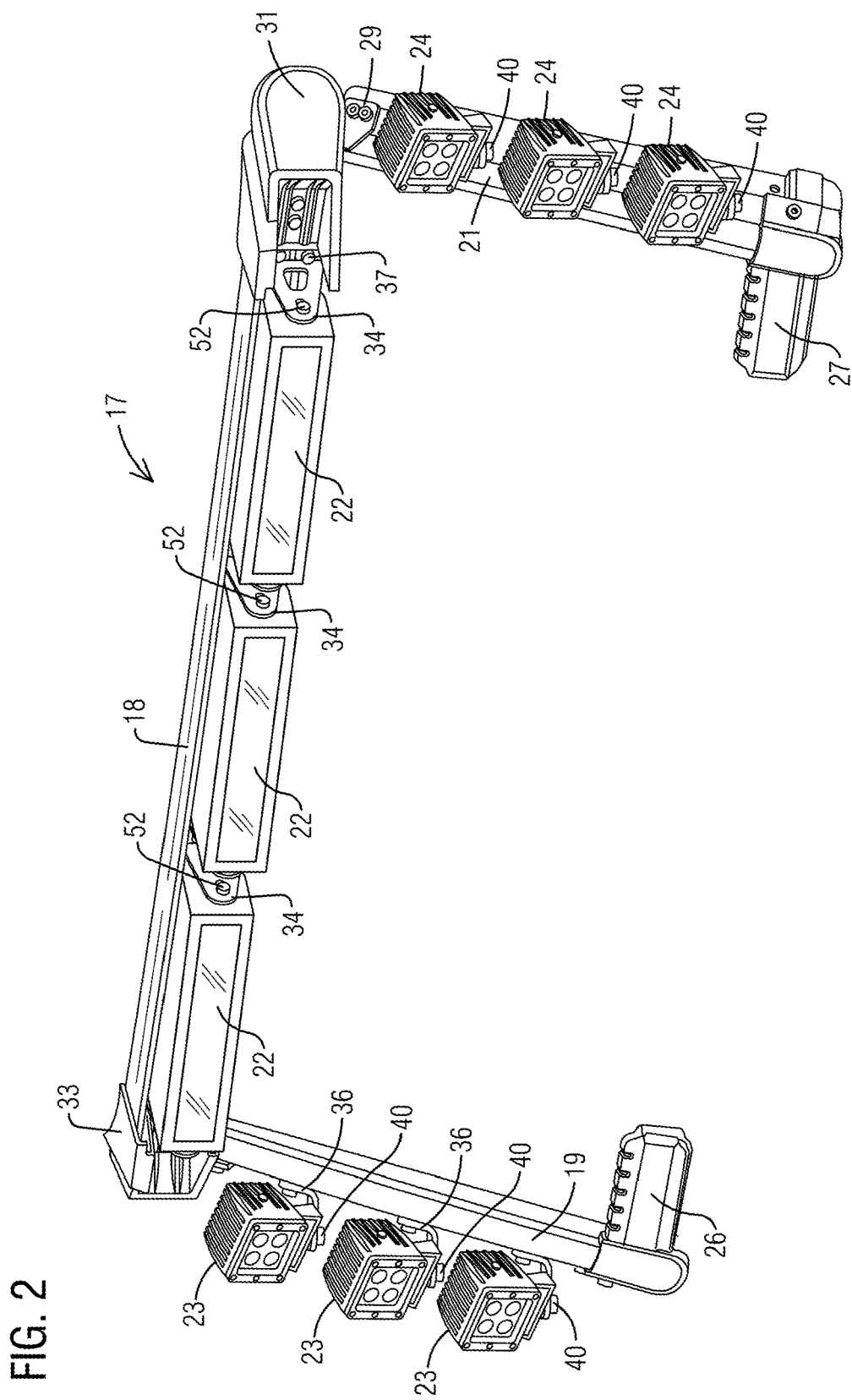
FIG. 2 is a perspective view of the modular light and accessory bar of FIG. 1 shown in isolation.

FIG. 2 illustrates the auxiliary light and accessory bar 17 removed from a vehicle and shows certain aspects in more detail. The top rail 18 of the bar 17 is seen to be arched or curved from its left end to its right end in a forward direction relative to a vehicle to which the bar 17 is attached. Lighting fixtures 22 are adjustably mounted to the top rail by means of mounting brackets 34 that are adjustably attached to the top rail with bolts 37 in a manner detailed below. Bolts 52 secure the lighting fixtures 22 to the adjustably attached mounting brackets 34 and allow the lighting fixtures 22 to be adjusted in orientation so that their light beams shine lower or higher as desired.

The left side pillar 21 is attached at its top end to the top rail 18 by means of a metal bracket 29. The metal bracket 29 is mostly covered by a plastic bracket cover 31, which improves the aesthetics of the assembly when mounted to a vehicle. A plurality of lighting fixtures 24 is mounted at spaced intervals along the left side pillar with the positions of the lighting fixtures being adjustable along the side pillar. More specifically, mounting brackets 36 (FIG. 3) are adjustably attachable to the left side pillar by means of bolts 38 and the lighting fixtures are mounted to the mounting brackets 36 by means of bolts 40. A wiring port cover 27 extends inwardly from the bottom end of left side pillar 21 for purposes described in more detail below.

The right side pillar 19 is a mirror image of the left side pillar and thus need not be described in great detail. The right side pillar 19 is attached at its top end with a bracket (not visible) to the right end of the top rail 18 and extends downwardly therefrom. The bracket is covered with a bracket cover 33 to hide the bracket and obtain a more pleasing finished appearance. A plurality of mounting brackets 36 is adjustably attached to the right side pillar and each supports a lighting fixture 23 attached with a bolt 40. As with the left side pillar 21, each of the mounting brackets 36 can be secured to the right side pillar at any desired location therealong to secure lighting fixtures or other auxiliary items at desired positions.

Figure 3:
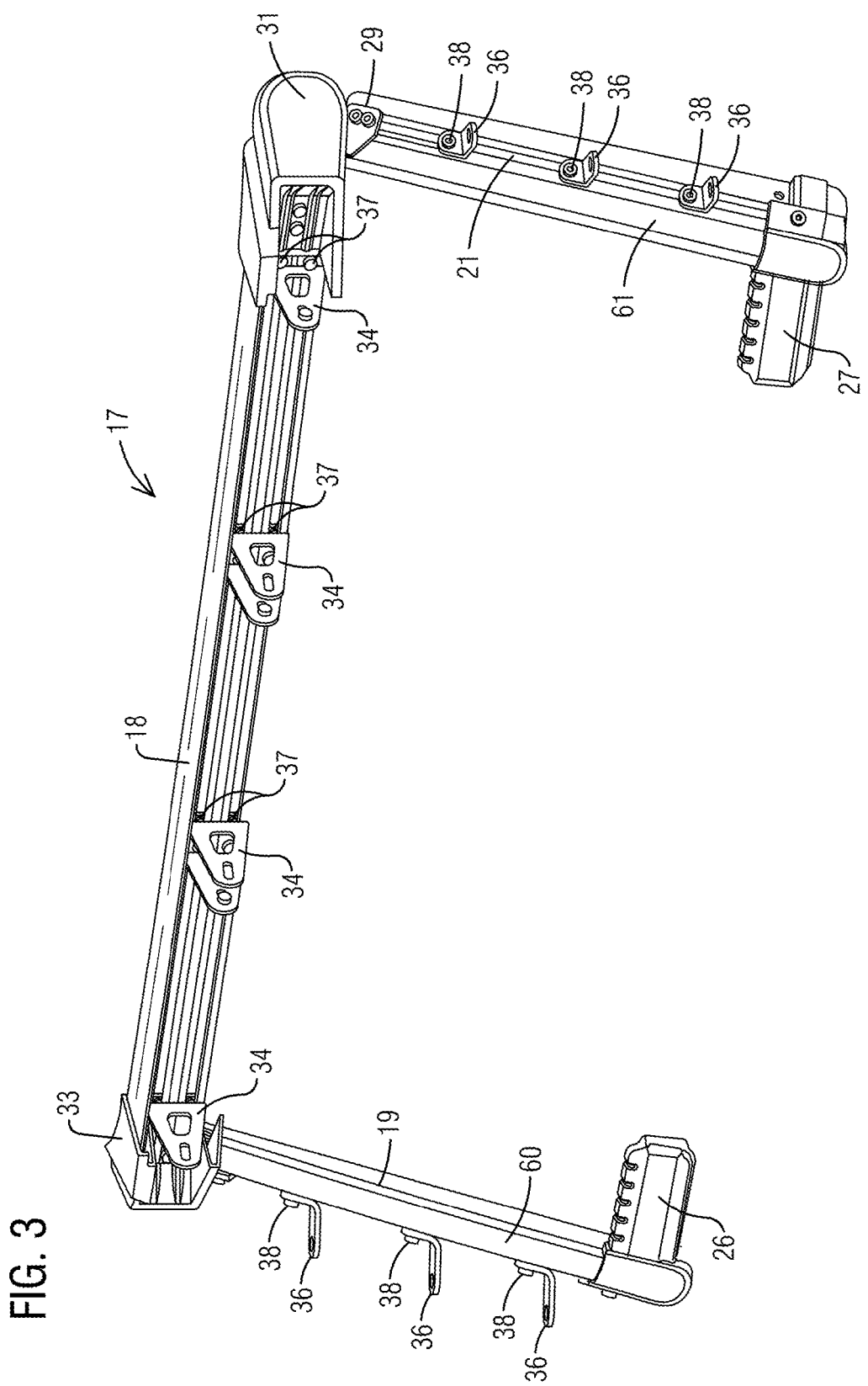
FIG. 3 is a perspective view of the modular light and accessory bar of FIG. 2 with the individual lighting fixtures removed to reveal various features of the bar assembly.

FIG. 3 shows a preferred embodiment of the auxiliary lighting and accessory bar 17 without lighting fixtures or other accessories attached. Mounting brackets 34 are seen here to be adjustably secured to the top rail 18 with bolts 37. Mounting brackets 36 are adjustably attached to the right and left side pillars with bolts 38. The right side wiring port cover 26 extends inwardly from the right side pillar 19 and left side wiring port cover 27 extends inwardly from the left side pillar 21. A right side wiring channel cover 60 covers a wiring channel formed along the right side pillar (detailed below) and a left side wiring channel cover 61 covers a wiring channel formed along the left side pillar.

Figure 4:
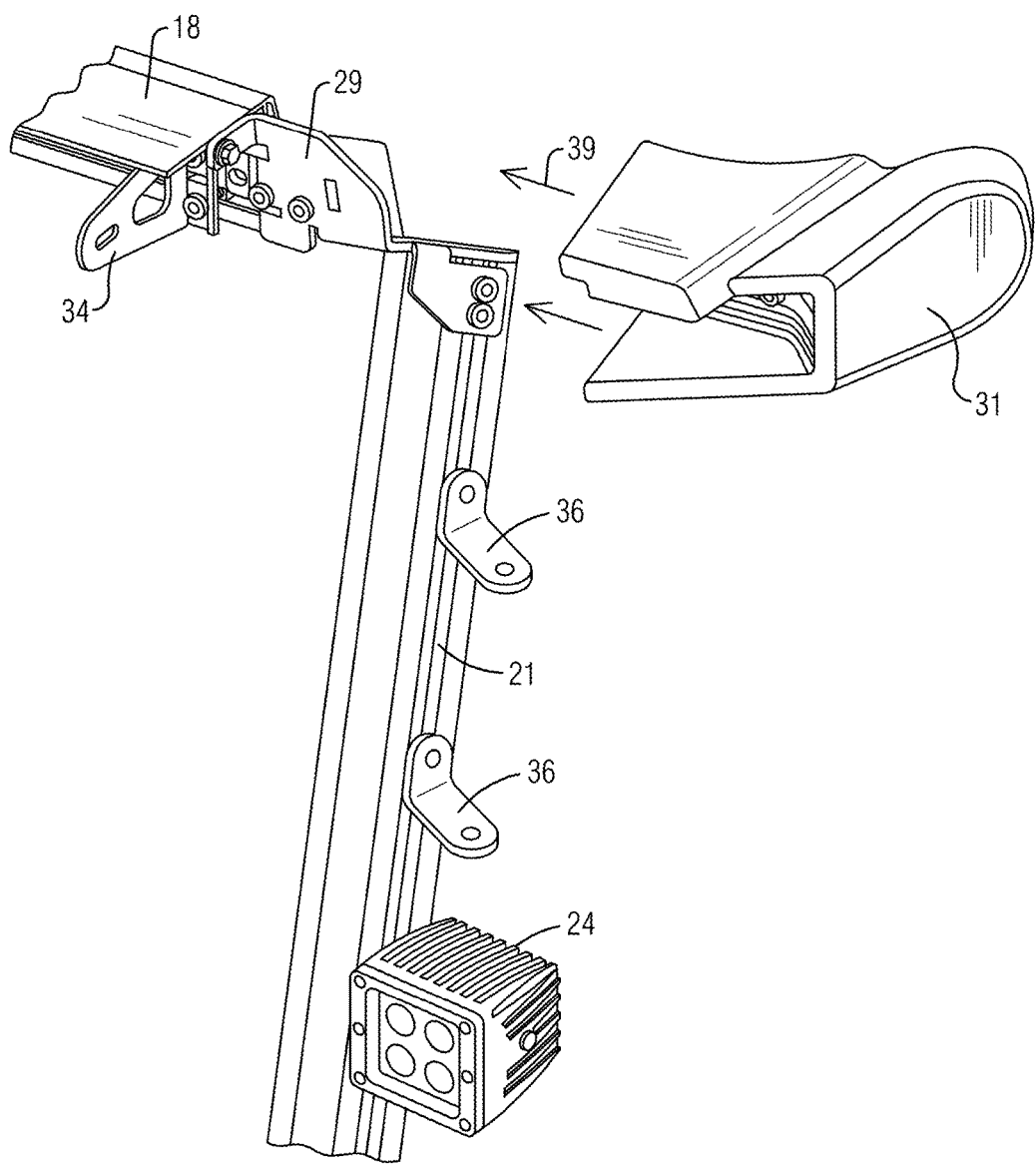
FIG. 4 is a perspective partially exploded view of the upper right corner of the modular light and accessory bar showing one structure for securing the top rail of the assembly to the side pillars of the assembly.

FIG. 4 shows the attachment of the left side pillar 21 to the top rail. More specifically, a metal bracket 29 is configured to attach at one end to the top rail by means of bolts, screws, clips, or other appropriate fasteners. The other end of the metal bracket 29 is attachable to the top end of the left side pillar by means of bolts, screws, clips, or other appropriate fasteners. In this way, the left side pillar is securely fixed to the top rail (as is the right side pillar). The left bracket cover, which may be fabricated from molded plastic, is configured to slide over the metal bracket 29 covering the bracket and partially covering the ends of the top rail and the left side pillar. This hides the metal bracket 29 and presents a more pleasing appearance when the assembly is mounted to a vehicle. It will be understood that the right side pillar, although mirrored, is attached to the right end of the top rail in the same way as the left side pillar.

Figure 5:
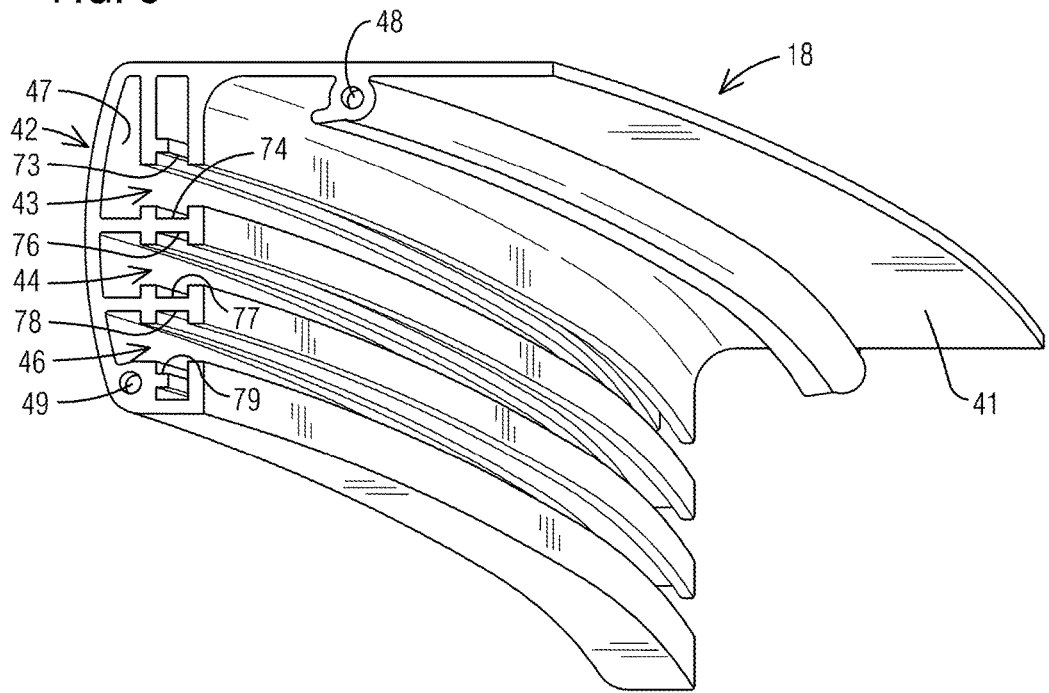
FIG. 5 is a perspective view of one preferred embodiment of the top rail of the assembly showing its curved shape and slotted features for attaching lights and accessories to the top rail.

FIG. 5 depicts the top rail 18 as seen from the right end portion thereof. The top rail preferably is fabricated as an aluminum extrusion, but may be made of other metals or plastics and through processes other than extrusion if desired. The top rail has a back 42 from which an upper shield 41 extends forwardly. The top rail is profiled to define a top T-channel 43, a middle T-channel 44, and a bottom T-channel 46. The top T-channel 43 includes a longitudinally extending nut slot defined between opposing structures 73 and 74. Similarly, the middle T-channel 44 includes a longitudinally extending nut slot defined between opposing structures 76 and 77 and the bottom T-channel 46 includes a longitudinally extending nut slot defined between opposing structures 78 and 79.

Each of the nut slots is sized to receive threaded nuts and to allow the threaded nuts to be slid along the length of the nut slot while restraining the nuts from rotating within the nut slot. These nuts are configured to receive attachment bolts used to hold mounting brackets 34 to the top rail. In practice, bolts are extended through a mounting bracket, through the open end of a T-channel, and threaded into a nut located within a nut slot of the top rail. The mounting bracket, bolts, and nuts can then be slid to a desired location along the top rail with the nuts sliding in their nut slots, whereupon the bolt can be tightened to secure the mounting bracket in place at that location. The forward curvature of the top rail 18 is clearly visible in FIG. 5 and screw bosses 48 and 49 may be extruded with the top rail to receive screws of the metal bracket 29 used to attach a side pillar to the top rail 18.

Figure 6:
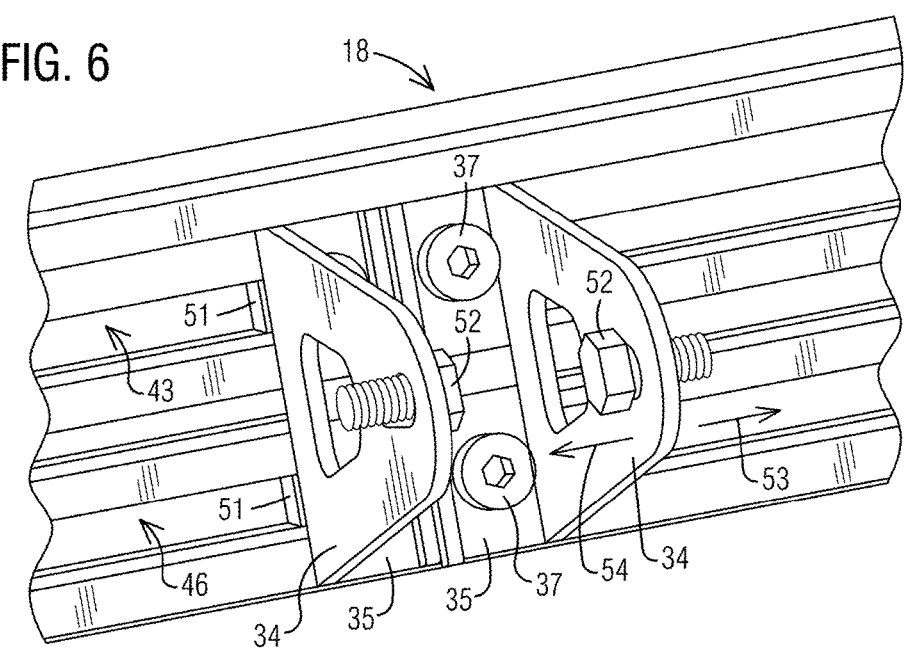
FIG. 6 is a perspective view showing mounting brackets adjustably secured to the top rail of the assembly for receiving and securing lighting fixtures or accessories to the top rail.

FIG. 6 illustrates better the fixing of mounting brackets 34 to the top rail 18 as described. Each mounting bracket 34 has a base 35 through which a pair of mounting holes (not visible) extends. The mounting holes are positioned to align, in this case, with the upper T-channel 43 and the lower T-channel 46. Nuts 51 are slidably but non-rotatably positioned in the nut slots of the upper and lower T-channels 43 and 46. Bolts 37 extend through the openings of respective T-channels and each bolt is threaded into a corresponding nut in the nut slot of the underlying T-channel. While simple mounting brackets 34 are shown in FIG. 6, it will be understood that mounting brackets of many different configurations may be attached to the top rail in the manner described for receiving different lighting fixtures or accessories to be mounted to the top rail.

It will be seen that with the nut loosely threaded in the manner described above, the entire assembly including mounting bracket 34, its associated bolts 37, and its associated nuts 51 can be slid along the top rail to any desired location. Tightening of the bolt then secures the mounting bracket to the top rail at that location. Lighting fixture mounting bolts 52 are shown in FIG. 6 for threading into the ends of a lighting fixture or other accessory located between two mounting brackets thereby securing the lighting fixture or other accessory to the top rail (See FIG. 1).

To assist with aligned mounting of, for example, lighting fixtures 22 to the top rail when, for example, the top rail is of an embodiment that is forwardly curved, a pivotable bracket assembly 70 may be employed. One such pivotable bracket assembly 70 is depicted in FIGS. 7A-7C. With reference to FIGS. 7A-7C, the pivotable bracket assembly 70 includes a mounting bracket 34' formed with a curved bottom segment 71 and an extending fixture-support 72, giving the bracket 34' a type of "J" shape. The bracket assembly 70 further includes independent base plates 35' that fit into the groove 73 of the bottom segment 71 in such a manner that they may move relative to the bracket 34'. Though it is not required, it is preferred that the base plates 35' have a semicircular profile, as depicted in FIG. 7A, such that they match the profile of the groove 73 and pivot within the groove relative to the bottom segment 71. As seen best in FIG. 7B, the bracket 34' includes elongated bolt passages (or mounting holes) 55 through which bolts 37 may pass when the bracket assembly 70 is being mounted to the top rail 18, for example at T-channels 43, 46. Thus, with reference to FIG. 7A (and in part to FIG. 6) each pivotable mounting bracket assembly 70 is positioned at the top rail 18 with its elongated bolt passages 55 aligned, in this case, with the T-channels 43, 46. Nuts 51 are slidably but non-rotatably positioned in the nut slots of the upper and lower T-channels 43 and 46. Bolts 37 extend through the base plates 35', through the bolt passages of the bracket 34' and into the nuts 51, and each bolt is threaded into the corresponding nut of the underlying T-channel.

With the nuts loosely threaded in the manner described above, the entire pivotable bracket assembly 70 can be slid along the top rail 18 to any desired location. Additionally, the pivotable mounting bracket 34' may be pivoted on its curved bottom segment 71 against the top rail, such that the bracket 34' may be adjusted in its angle relative to the rail 18. The elongated bolt passages 55 and the independent plates 35' allow perpendicular entry of the bolts 37 into the channels 43, 46 and into the nuts 51, while at the same time allowing pivoting of the bracket 34' relative to the bolts and, thus, pivoting of the bracket on its curved bottom segment 71 relative to the top rail 18. For example, the extending fixture-supports 72 of adjacent bracket assemblies 70 may be adjusted by this pivoting to extend outwardly at various angles from the top rail 18 in order that the fixture attached to the supports, for example a light fixture 22, may be forward facing regardless of where the fixture is mounted along the curve of the top rail. Tightening of the bolts then secures the otherwise pivotable mounting bracket assembly 70 to the top rail at that location and in the selected angled-Orientation.

Figure 8:
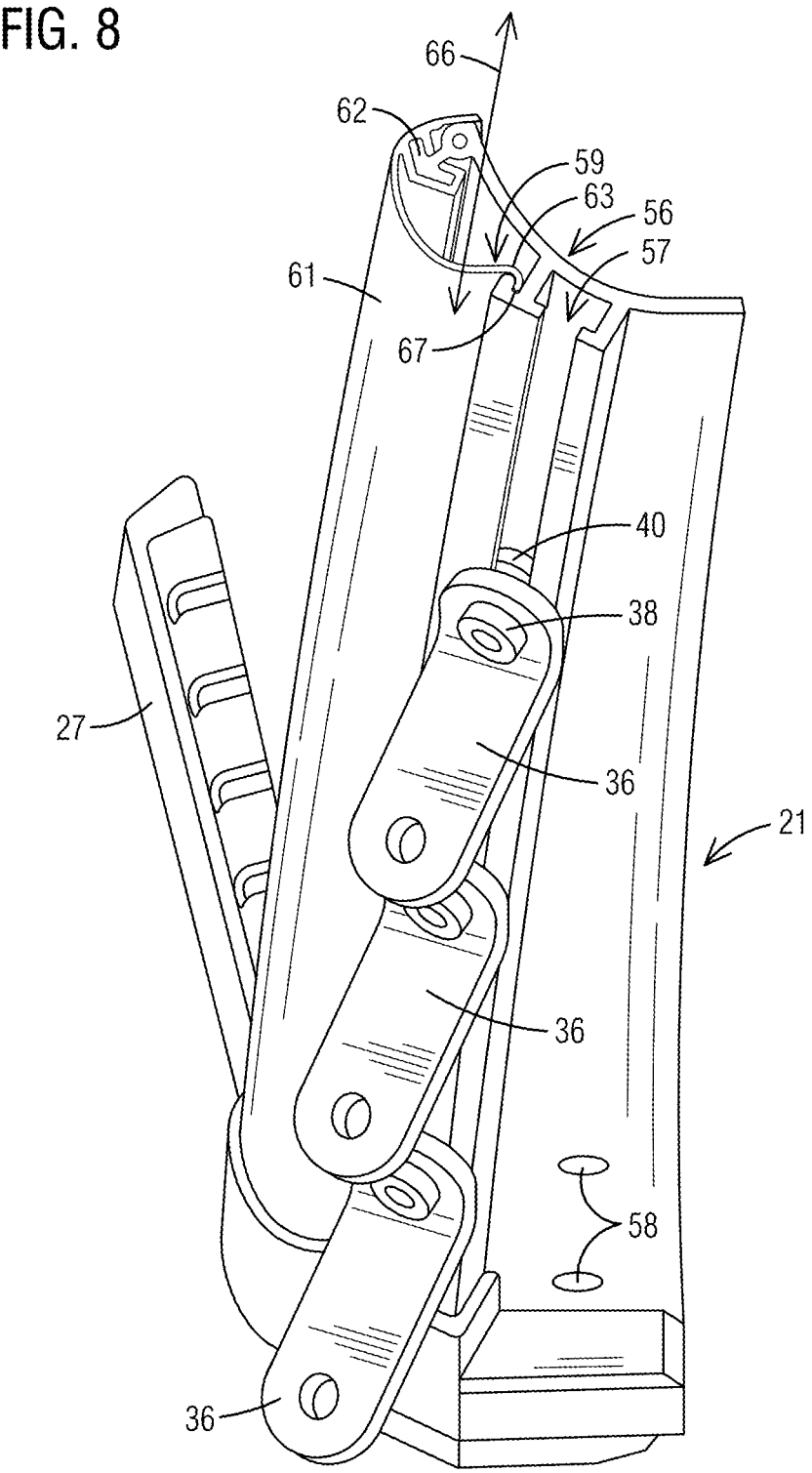
FIG. 8 is a perspective view of the left side pillar of the assembly showing its modular mounting features and wire routing channel, the right side rail being a mirror image thereof.

FIG. 8 is an enlarged perspective of the left side pillar illustrating better some of its features. The left side pillar 21 preferably is made of extruded aluminum, but may be made from another metal or material or with a process other than extrusion within the scope of the invention. The left side pillar has a body 56 that is arched to extend neatly around the left support pillar of the windshield. Mounting holes 58 are sized to receive screws or other fasteners used to attach the left side pillar 21 to the support pillar. Other mounting holes may be formed at other locations on the pillar to ensure that the pillar is securely attached to its support pillar.

The left side pillar 21 is profiled to define a longitudinally extending T-channel 57 extending from the top end of the left side pillar 21 to the bottom end of the left side pillar. The T-channel defines a longitudinally extending nut slot that is sized to receive nuts 50 and allow them to slide along the T-channel while preventing the nuts from rotating with the T-channel. One or more mounting brackets 36 can be loosely mounted to the left side pillar 21 by extending a bolt 38 through a mounting hole in the mounting bracket, threading it loosely into a nut, and sliding the mounting bracket, bolt, and nut along the T-channel to a desired location. The bolt 38 can then be tightened to secure the mounting bracket 36 in place at that location.

The left side pillar 21 is further profiled to define a wiring channel 59 that extends along the length of the pillar from the top of the pillar to the bottom of the pillar. The wiring channel is configured to receive a wiring channel cover 61 that covers the open top of the wiring channel. More specifically, an arrow-shaped tang 62 extending along one side of the wiring channel is sized and shaped to be received in a similarly shaped channel formed along one side of the wiring channel cover 61. A slot 64 is formed along the opposite side of the wiring channel and is configured to capture an out-turned lip 63 along the opposite side of the wiring channel cover 61. With such an embodiment, the wiring channel cover can be slid easily onto and off of the left side pillar as indicated by arrows 66.

When routing wiring that supplies power or signal to a lighting fixture or accessory mounted on the left side pillar 21, the wires are routed from their source within the vehicle and through the body of the vehicle at a location covered by the left wiring port cover 27. The wiring can then be routed through the wiring channel 59. When one or more wires needs to exit the channel to connect to a lighting fixture or other accessory, a small hole or slot can be formed in the plastic wiring channel cover 61 at the appropriate location. The wires are then threaded through the hole or slot and attached to the lighting fixture or accessory. Wiring associated with lighting fixtures or accessories mounted to the top rail can be routed through the wiring channel 59 of one of the side pillars and through a T-channel of the top rail. In this way, substantially all of the wiring associated with lighting and accessories attached to the light bar assembly is hidden and a neat clean appearance is presented.

The invention has been described herein in terms of preferred embodiments and methodologies that exemplify the invention and that are considered by the inventors to represent the best modes of carrying out the invention. A variety of additions, deletions, and modifications, both subtle and gross, might well be made to the illustrated embodiments without departing from the spirit and scope of the invention, which is delineated only by the claims.

What is claimed is:
1. A modular light and accessory bar for a vehicle comprising:
   a top rail having a length selected to span substantially a width of the vehicle at a top of the vehicle, a right end, and a left end;
   a right side pillar configured to be attached to the top rail at the right end thereof and extend downwardly therefrom;

a left side pillar configured to be attached to the top rail at the left end thereof and extend downwardly therefrom;

the top rail being formed with at least one attachment feature extending therealong;

at least one bracket configured to support a lighting fixture or accessory;

the at least one bracket being attachable to the attachment feature of the top rail;

the attachment feature being configured to permit the at least one bracket to be attached at any desired location along the top rail.

2. A modular light and accessory bar for a vehicle as claimed in claim 1 wherein the attachment feature of the top rail comprises at least one slot extending along the length of the top rail.

3. A modular light and accessory bar for a vehicle as claimed in claim 2 wherein the at least one slot comprises at least two slots.

4. A modular light and accessory bar for a vehicle as claimed in claim 2 wherein the at least one slot comprises at least one T-slot.

5. A modular light and accessory bar for a vehicle as claimed in claim 4 further comprising opposing features in the at least one T-slot that define a nut slot extending along the length of the top rail.

6. A modular light and accessory bar for a vehicle as claimed in claim 1 further comprising a first bracket securing the first side pillar to the first end of the top rail.

7. A modular light and accessory bar for a vehicle as claimed in claim 6 further comprising a second bracket securing the second side pillar to the second end of the top rail.

8. A modular light and accessory bar for a vehicle as claimed in claim 1 further comprising a right attachment feature extending along the right side pillar and a left attachment feature extending along the left side pillar, the right and left attachment features being configured to receive and support at least one bracket for securing a lighting fixture or accessory at a desired location along the right and left side pillars.

9. A modular light and accessory bar for a vehicle as claimed in claim 8 wherein the attachment feature of the left side pillar and the attachment feature of the right side pillar comprise a slot extending along the respective side pillar.

10. A modular light and accessory bar for a vehicle as claimed in claim 9 wherein the slot comprises a T-slot.

11. A modular light and accessory bar for a vehicle as claimed in claim 8 further comprising a wiring channel extending along the right side pillar and a wiring channel extending along the left side pillar, the wiring channels being configured to contain wiring related to lights or accessories mounted to the side pillars and the top rail.

12. A modular light and accessory bar for a vehicle as claimed in claim 11 further comprising a cover over the wiring channels.

13. A modular light and accessory bar for a vehicle as claimed in claim 12 wherein each of the covers is removably attached to the corresponding side pillar.

14. A modular light and accessory bar for a vehicle as claimed in claim 13 wherein each of the covers is slidably removably attached to the corresponding side pillar.

15. A modular light and accessory bar for a vehicle as claimed in claim 1 wherein the top rail is curved forwardly relative to a vehicle to which the modular light and accessory bar is attached.

16. A modular light and accessory bar for a vehicle as claimed in claim 15 wherein the at least one bracket comprises a curved bottom segment and a fixture-support extending from the curved bottom segment.

17. A modular light and accessory bar for a vehicle as claimed in claim 16, wherein, when the at least one bracket is attached to the attachment feature, the curved bottom segment is adjacent the attachment feature and the at least one bracket is pivotable on the bottom segment relative to the attachment feature.

18. A modular light and accessory bar for a vehicle as claimed in claim 1 wherein the at least one bracket comprises a curved bottom segment and a fixture-support extending from the curved bottom segment.

19. A modular light and accessory bar for attachment to a vehicle having a windshield with a top edge, a right side edge, and a left side edge, the modular light and accessory bar comprising a right side pillar configured to be attached to the vehicle extending along the right side edge of the windshield, a left side pillar configured to be attached to the vehicle extending along the left side edge of the windshield, and a top rail configured to extend along the top edge of the windshield between a top end of the right side pillar and a top end of the left side pillar, at least one slot extending along the length of the right side pillar and being configured to receive at least one fastener element and to allow the fastener element to slide along the length of the at least one slot, at least one slot extending along the length of the left side pillar and being configured to receive at least one fastener element, at least one slot extending along the top rail and being configured to receive a fastener element and to allow the fastener element to slide along the length of the at least one slot, at least one mounting bracket attachable to the at least one fastener element of the right side pillar and movable therewith along the length of the slot thereof, at least one mounting bracket attachable to the at least one fastener element of the left side pillar and movable therewith along the length of the slot thereof, and at least one mounting bracket attachable to the at least one fastener element of the top rail and movable therewith along the length of the slot thereof, the mounting brackets being configured to receive and secure lighting fixtures or accessories to the left side pillar, the right side pillar, and the top rail.

20. A modular light and accessory bar as claimed in claim 19 further comprising a right side wiring channel extending along the right side pillar and a left side wiring channel extending along the left side pillar, the right and left side wiring channels being configured to contain wiring associated with lighting fixtures or accessories attached to the modular light and accessory bar.

21. A modular light and accessory bar as claimed in claim 20 further comprising a wiring channel cover removably attached to each of the right side pillar and the left side pillar, the wiring channel covers covering their respective channels and wiring disposed therein.

22. A modular light and accessory bar as claimed in claim 19 wherein the top rail is curved forwardly relative to a vehicle to which the modular light and accessory bar is attached.

23. A modular light and accessory bar for a vehicle as claimed in claim 22 wherein the at least one bracket comprises a curved bottom segment and a fixture-support extending from the curved bottom segment.

24. A modular light and accessory bar for a vehicle as claimed in claim 23, wherein, when the at least one bracket is attached to the attachment feature, the curved bottom segment is adjacent the attachment feature and the at least one bracket is pivotable on the bottom segment relative to the attachment feature.

25. A modular light and accessory bar for a vehicle as claimed in claim 19 wherein the at least one bracket comprises a curved bottom segment and a fixture-support extending from the curved bottom segment.

\* \* \* \* \*